(12) United States Patent
Shindo

(10) Patent No.: US 8,267,779 B2
(45) Date of Patent: Sep. 18, 2012

(54) PROGRAM, STORAGE MEDIUM ON WHICH PROGRAM IS RECORDED, AND GAME DEVICE

(75) Inventor: Takafumi Shindo, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 798 days.

(21) Appl. No.: 12/084,475

(22) PCT Filed: Nov. 1, 2006

(86) PCT No.: PCT/JP2006/321876
§ 371 (c)(1),
(2), (4) Date: May 13, 2009

(87) PCT Pub. No.: WO2007/052707
PCT Pub. Date: May 10, 2007

(65) Prior Publication Data
US 2010/0004041 A1    Jan. 7, 2010

(30) Foreign Application Priority Data
Nov. 4, 2005 (JP) .................................. 2005-321114

(51) Int. Cl.
*A63F 9/24* (2006.01)
(52) U.S. Cl. ................. 463/30; 463/31; 463/36; 463/37
(58) Field of Classification Search .............. 463/30–32, 463/36, 37
See application file for complete search history.

(56) References Cited

U.S. PATENT DOCUMENTS
6,149,520 A * 11/2000 Takatsuka ......................... 463/4
(Continued)

FOREIGN PATENT DOCUMENTS
JP     11-90045     4/1999
(Continued)

OTHER PUBLICATIONS

"Madden NFL 2004", © 2004 EA Sports, p. 1 and p. 12 (at http://safemanuals.com/user-guide-instructions-owner-manual/GAMES%20MICROSOFT%20XBOX/MADDEN%20NFL%202004-_E).*

(Continued)

*Primary Examiner* — Peter DungBa Vo
*Assistant Examiner* — Steve Rowland
(74) *Attorney, Agent, or Firm* — Finnegan, Henderson, Farabow, Garrett & Dunner, L.L.P.

(57) ABSTRACT

The present invention provides an image processing method or the like for a game device, in which a ball game involving putting a ball into a goal is executed, and in which more realistic game development can be constructed. An image processing method is carried out in which, in a game device, a ball game of putting a ball into a goal is executed by displaying images of a self-character, a plurality of own-team characters, and a plurality of opponent characters moving in a virtual space, and while a ball holder BH, which is an opponent character, is in possession of the ball, a self-character 20 is caused to move to a delay defense area 27, which is a region located separated, by a second distance (for example 2 m), from a position a first distance away (target position, 3 m) from the ball holder BH on a course line 23 connecting the ball holder BH and a goal G in response to pressing of a delay defense button, which is a single input operation of operation means (controller) operated by a game player (player).

5 Claims, 18 Drawing Sheets

U.S. PATENT DOCUMENTS

| | | | |
|---|---|---|---|
| 2002/0082064 A1* | 6/2002 | Hillman | 463/4 |
| 2002/0183104 A1* | 12/2002 | Takemoto et al. | 463/4 |
| 2004/0259616 A1* | 12/2004 | Hirai | 463/4 |
| 2005/0070349 A1* | 3/2005 | Kimura | 463/4 |
| 2005/0186999 A1* | 8/2005 | Melgosa et al. | 463/2 |
| 2006/0287023 A1* | 12/2006 | Yokoyama | 463/3 |

FOREIGN PATENT DOCUMENTS

| | | |
|---|---|---|
| JP | 2004-329531 | 11/2004 |

OTHER PUBLICATIONS

Konami Co., Ltd., Konami Kampeki Koryaku Series (98) World Soccer Winning Eleven 7 Master League Kyukyoku Bible first edition, Sep. 15, 2003, p. 28-30, 44, 49.

Media Works Inc., World Soccer Winning Eleven 8, Dengeki PlayStation 2004 Nen 9/10 Go, vol. 10, No. 24, Sep. 10, 2004, p. 102.

Media Works inc, World Soccer Winning Eleven 7, Dengeki PlayStation 2003 Nen 8/29 Go, vol. 9, No. 22, Aug. 29, 2003, p. 110-112.

English language International Search Report for PCT/JP2006/321876 dated Jan. 23, 2007 (3 pages).

International Preliminary Report on Patentability and Written Opinion issued by the International Bureau on May 15, 2008 for PCT/JP2006/321876 (11 pages).

Notice of Reasons for Rejection issued in JP 2005-321114, mailed Apr. 22, 2011.

Hiroshi Hirata et al., Konami Kampeki Koryaku Series (100) Soccer Kantoku Saihai Simulation, Formation Final, Official Complete Guide, Konami Co., Ltd, first edition, Nov. 10, 2003, pp. 104-106.

Konami Co., Ltd., Konami Kampeki Koryaku Series (98) World Soccer Winning Eleven 7 Master League Kyukyoku Bible first edition, first edition, Sep. 15, 2003, pp. 90, 186.

Konami, "Pro Evolution Soccer 4 passage" Pro Evolution Soccer 4, Oct. 15, 2004, 12 pages.

"FIFA Football 2002," Nov. 2, 2001, 5 pages.

Supplemental European Search Report issued by EPO, mailing date Aug. 25, 2009, for PCT/JP2006/321876 (7 pages).

* cited by examiner

FIG.16

| <No.> | <ANGLE> | <TRAJECTORY> |
|---|---|---|
| 1 | 0 DEGREES | SAME AS WHEN DIRECTION KEYS NOT PUSHED (MOVEMENT IN REFERENCE DIRECTION) |
| 2 | LEFT 45 DEGREES | TRAJECTORY GOING AROUND LEFT (SMALL) |
| 3 | RIGHT 45 DEGREES | TRAJECTORY GOING AROUND RIGHT (SMALL) |
| 4 | LEFT 90 DEGREES | TRAJECTORY GOING AROUND LEFT (MEDIUM) |
| 5 | RIGHT 90 DEGREES | TRAJECTORY GOING AROUND RIGHT (MEDIUM) |
| 6 | LEFT 135 DEGREES | SAME AS LEFT 90 DEGREES |
| 7 | RIGHT 135 DEGREES | SAME AS RIGHT 90 DEGREES |
| 8 | 180 DEGREES | MOVEMENT TO DIRECTION CORRESPONDING TO ABSOLUTE AXIS (CORRECTION, ROUND RUN NOT CARRIED OUT) |

PROGRAM, STORAGE MEDIUM ON WHICH PROGRAM IS RECORDED, AND GAME DEVICE

CROSS REFERENCE TO RELATED APPLICATIONS

This application is a national phase application based on international application number PCT/JP2006/321876, filed Nov. 1, 2006, and claims priority of Japanese Patent Application No. 2005-321114, filed Nov. 4, 2005.

BACKGROUND

The present invention relates to programs and the like of game devices on which a game is executed by displaying images in which a plurality of characters including a self-character move within a game space, and particularly relates to programs in a case where the self-character is caused to move.

In addition to a type of game in which a character operated by a player (game player) fights on a one-against-one basis against an enemy character controlled by a computer, games that make use of image processing include a type of game in which the self-character fights as one character of his own team against an opponent team on a many-against-many basis An example corresponding to this would be team sports ball games such as soccer and basketball.

For example, patent document 1 discloses a technique in a soccer game or the like in which actions of characters involved in the development of the game are aligned with actions of actual athletes and are controlled naturally; for example, paragraphs 0134 to 0138 discloses control relating to movement actions in which an athlete character of a defending-side team is caused to move toward a target position that has been established so as to mark an athlete character of an attacking-side team.
Patent document 1: JP 2004329531A In types of games involving fighting against an opponent team on a many-against-many basis, there are multiple objects for image processing and the control thereof, and assuming more realistic game development, there is a large scope for improvements to reflect this in image processing techniques (programs) and the like.

For example, although patent document 1 discloses causing the athlete characters of a defending-side team to move toward a target position that has been established so as to mark the athlete characters of an attacking-side team, no examination is given therein in regard to such factors as a method of setting the target position, the convenience of operation for the player at that time, and a trajectory of movement until the target position.

SUMMARY

An object of the present invention is to provide an image processing technique or the like that enables more realistic game development to be constructed by setting this target position as a predetermined region when moving a self-character.

Furthermore, an object of the present invention is to achieve convenience in operation by the player when moving the self-character and to provide rapid operation as well as an image processing technique (program) or the like to support this.

Furthermore, an object of the present invention is to provide an image processing technique or the like that enables more realistic game development to be constructed by appropriately setting a movement trajectory of the self-character.

Accordingly, (1) a program according to the present invention includes a program, in which a ball game is executed involving causing a first character and a second character to move in a virtual space and putting a ball into a goal, and in which a process involving generating and displaying on a screen images of the virtual space as viewed from a virtual viewpoint is executed on a computer, comprising: a first process of determining whether or not the second character is in possession of the ball, a second process of determining whether or not the first character is positioned within a region that is set corresponding to the second character away from a position where the second character is present, and a third process of causing the first character to move toward the region when the second character is in possession of the ball and when the first character is not positioned inside the region.

By setting a movement destination of the first character to the region in this manner, a realistic game involving effective defense for example can be carried out.

Furthermore, (2) a program according to the present invention includes a program for executing a game by causing a character to move in a virtual space, and for causing a computer to execute a process of generating images of the virtual space as viewed from a virtual viewpoint and displaying the images on a screen, the program comprising: a) when a character is caused to move to a predetermined position in response to a first input operation from operation means operated by a game player, b) a process of obtaining a distance between the character and the predetermined position, c) a process of determining whether or not a second input operation has been performed by the operation means when the distance is a fixed distance or greater, and d) when a second input operation of the operation means has been performed, a process of deciding a movement trajectory of the character in response to the second input operation.

In this manner, by appropriately setting a movement trajectory of the self-character, a more realistic game involving effective defense for example can be carried out.

With the present invention, it is possible to provide an image processing technique or the like that enables more realistic game development to be constructed.

Furthermore, with the present invention, convenience in operation by the player is achieved, and it is possible to provide an image processing technique or the like to support this with rapid operation.

DESCRIPTION OF DRAWINGS

FIG. 16 is a table showing a relationship between movement direction and movement trajectory.

It should be noted that an explanation of symbols used in FIG. 1 to FIG. 24 is as follows. S1 to S11—steps, BH—ball holder, B—ball, G—goal, Gc—center point of goal line, 20—self-character, 23—goal line, 25—target reference point, 27—delay defense area, 30—controller, 31—direction keys, 31*a* to 31*d*—direction keys, 33*a* to 33*f*—buttons, 35, 37—analog keys, 40*a*, 40*b*—cameras, A, B—orientation of camera, 43—field, 45—centerline, S51 to S55—steps, S61 to S64—steps, S71 to S77—steps, 81—first target area, 83—first target point, 100—game device, 101—storage medium, 102—CPU, 103—system memory, 104—boot ROM, 105—bus arbiter, 106—rendering processor, 107—graphics memory, 108—sound processor, 109—sound memory, 110—display monitor, 111—speaker, 112—modem, 113—backup memory, 114—controller, 200—self-character, 221*a* to 221*c*—trajectories of movement of self-character, 223—goal line, 225—target reference point, 200*a*—position of self-character after movement, BHa—position of ball holder after movement, S27 to S29—steps, D1 to D6—movement direction of self-character, P1 to P6—position of self-character, θ1 to θ5—angle formed, S31 to S34—steps

DETAILED DESCRIPTION

Embodiment 1

Hereinafter, embodiments of the present invention are described in detail with reference to the accompanying drawings. It should be noted that items having same functions are given same or related symbols and repetitive description thereof is omitted.

For example, when using a game device to play a team sports ball game such as a soccer game, one character in one's own team in a virtual space viewed from a virtual perspective (a game space, stadium, field) is set as the self-character playing against an opponent team on a many-against-many basis. When the opponent team is keeping (in possession of) the ball in this type of game, one's own team, including the self-character, carries out defense. Namely, [one's own team] carries out actions to prevent opponent athletes (opponent characters) who are in possession of the ball from scoring a goal and also to recapture the ball. It should be noted that "self-character" refers to a character that is operable in response to operation means (transmission and receiving of operation signals) operated by the player.

Figure 1:
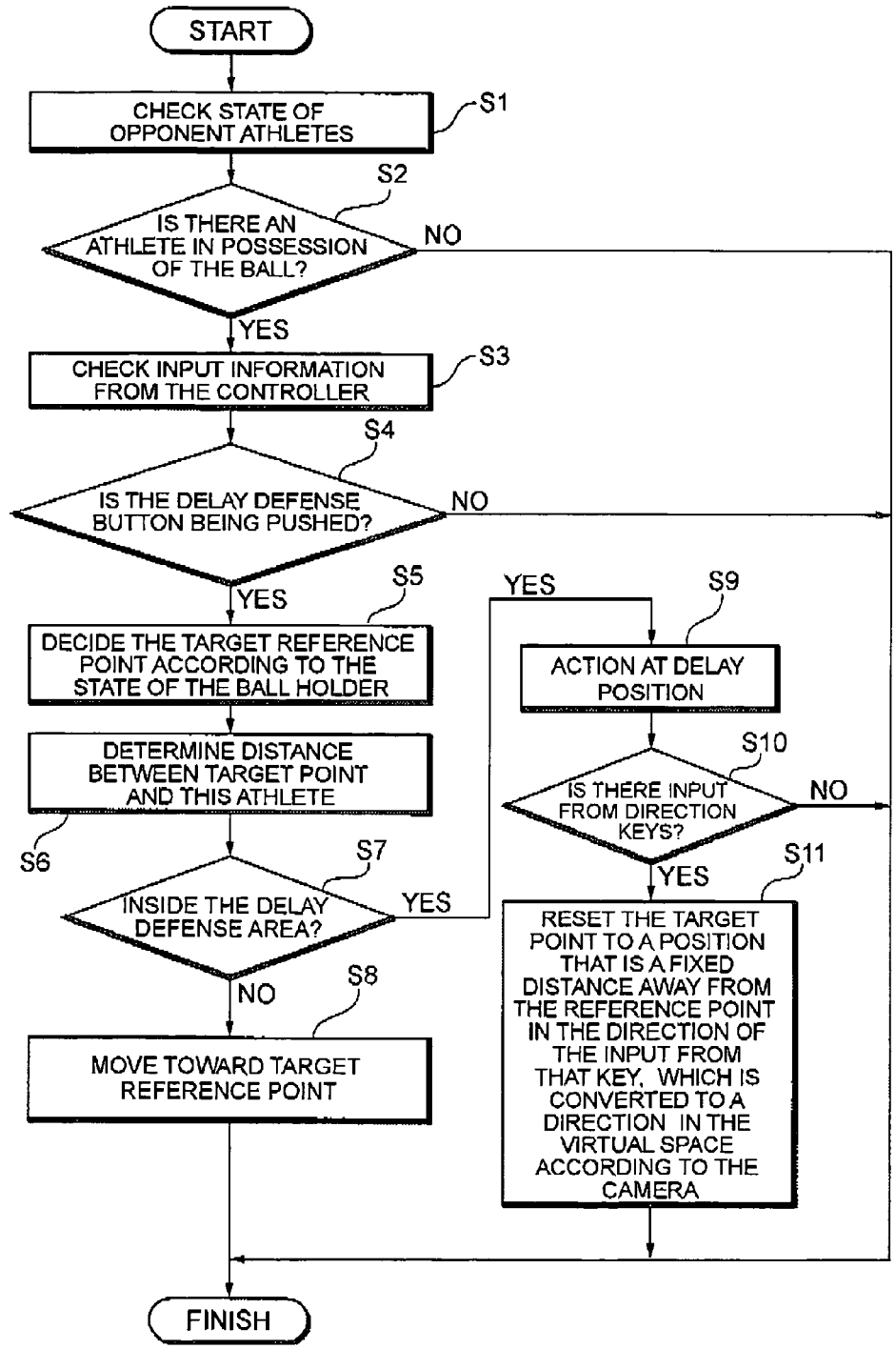
FIG. 1 is a flowchart showing a movement process (image processing technique) of a character according to embodiment 1.
Figure 2:
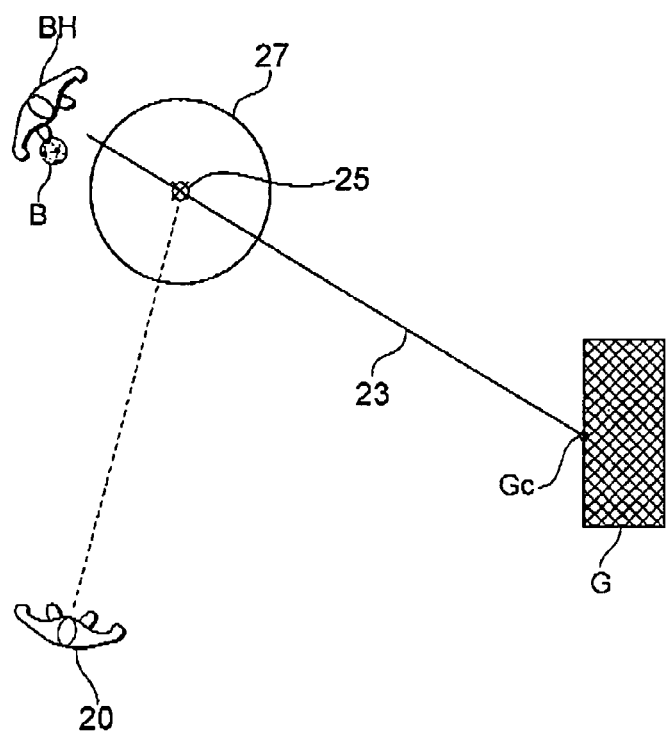
FIG. 2 is a schematic diagram showing an outline of a movement process of a character according to embodiment 1.

FIG. 1 is a flowchart showing a movement process (image processing technique, program) of a character according to the present embodiment. FIG. 2 is a schematic diagram showing an outline of a movement process of a character according to the present embodiment.

Figure 20:
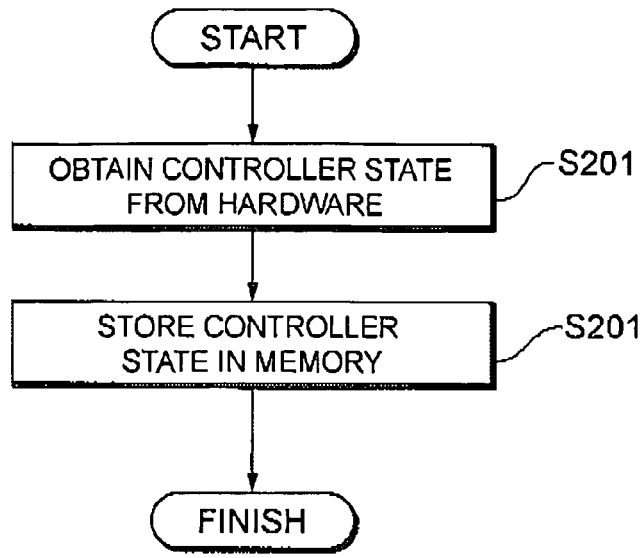
FIG. 20 is a flowchart showing obtaining input information from the controller.

For example, as shown in FIG. 1, a CPU (see FIG. 10), which is a control means inside the game device, checks a state of the opponent athletes (step S1) and determines whether or not there is an athlete among the opponent athletes who is in possession of the ball (step S2). In a case where there is no athlete in possession of the ball among the opponent athletes, the present process finishes. In a case where there is an athlete in possession of the ball among the opponent athletes, input information from the controller is checked (step S3). As shown in the flowchart of FIG. 20, obtaining input information from the controller is carried out by first obtaining a state of the controller from the hardware (S201), then storing the state of the controller in a memory (S202).

First, description is given regarding a ball holder. Whether or not an athlete is in possession of the ball is determined by such factors as an athlete object (3D model) and a ball object (3D model) inside the virtual space. For example, it is determined by (1) whether or not the ball object (3D model) is present within a region established by the CPU based on the athlete object (3D model), or in addition to this determination, (2) whether there is motion information of the athlete object (3D model), specifically, whether [the athlete] has trapped, dribbled, or shot [the ball].

For example, there is a state in which [an athlete] is in possession of the ball when the ball is present within the aforementioned region and the ball is under the control of that athlete due to an action such as trapping by the athlete, and the state of being in possession of the ball is terminated when the ball is captured by a kick or tackle of an opponent athlete.

In this manner, whether or not the ball is in possession [of an athlete] may be determined according to a positional relationship between the athlete object (3D model) and the ball object (3D model) and motion information or the like, and whether or not the ball is in possession [of an athlete] may also be determined according to motion information and a position of the ball object as a result thereof.

With this determination, the CPU can determine which athlete is in possession of the ball and sets a flag to "on" indicating that the athlete of that "athlete ID" is in possession of the ball. By checking this flag, the CPU can determine at any time the athlete who is in possession of the ball.

Figure 3:
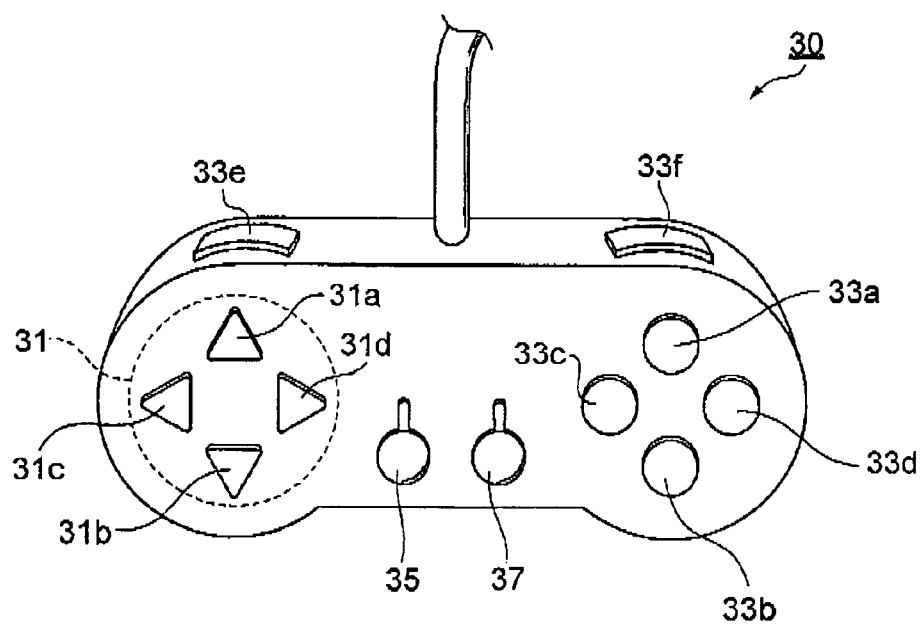
FIG. 3 is a schematic drawing of an ordinary controller connected to a game device.

Next, description is given regarding the controller (operation means). FIG. 3 is a schematic diagram of an ordinary controller 30 connected to the game device. As shown in FIG. 3, a plurality of buttons (keys) are provided on the controller.

For example, movement directions of a character can be indicated by operating direction keys 31 up and down (31a and 31b) or left and right (31c and 31d). Indications such as these can also be carried out by using analog keys 35 and 37. Other buttons (33a to 33f) are assigned to operation indications such as passing, shooting, and tackling for example. These operation indications can be varied as appropriate in response to the game conditions. That is, even for the same button, when in defense for example, [a button] may be assigned to a tackle action indication and when in offense (attacking), it may be assigned to a shooting action indication.

During a movement process of a character according to the present embodiment, the button 33c is assigned to an action indication referred to as "carrying out a delay defense," and the button 33b is assigned to an indication referred to as "go toward the ball."

Accordingly, when input information from the controller is checked as shown in FIG. 1 (step S3), a determination is performed as to whether or not the delay defense button 33c is being pushed, that is, whether or not an operation signal has been received (step S4), and in a case where the button 33c has not been pushed, the present processing finishes. On the other hand, if the button 33c has been pushed, a target reference point is decided according to a state of the ball holder (the opponent athlete in possession of the ball) (step S5).

Here, description is given regarding a target reference point 25 with reference to FIG. 2. The target reference point 25 refers to a point on a course line 23 that connects a ball holder BH and a central point Gc of a goal line of a goal G, and is a first distance, for example, 3 m, away from the ball holder BH. A region located separated from the target reference point 25 by a second distance, for example, 2 m, is set as a delay defense area 27. [Symbol] 20 indicates the self-character and [symbol] B indicates the ball. It should be noted that the distances here correspond to a scale within the game space and do not indicate an actual distance on the screen. Furthermore, the course line 23 may be prescribed as a line that connects the ball holder BH and a point of the goal G closest to the ball holder BH (for example, in FIG. 2 this is the upper edge portion of the goal line). In this manner, it is sufficient that a specific position within the goal that is established with respect to the goal is set as a reference point, and a line that connects this reference point and the ball holder BH is set as the course line.

Figure 22:
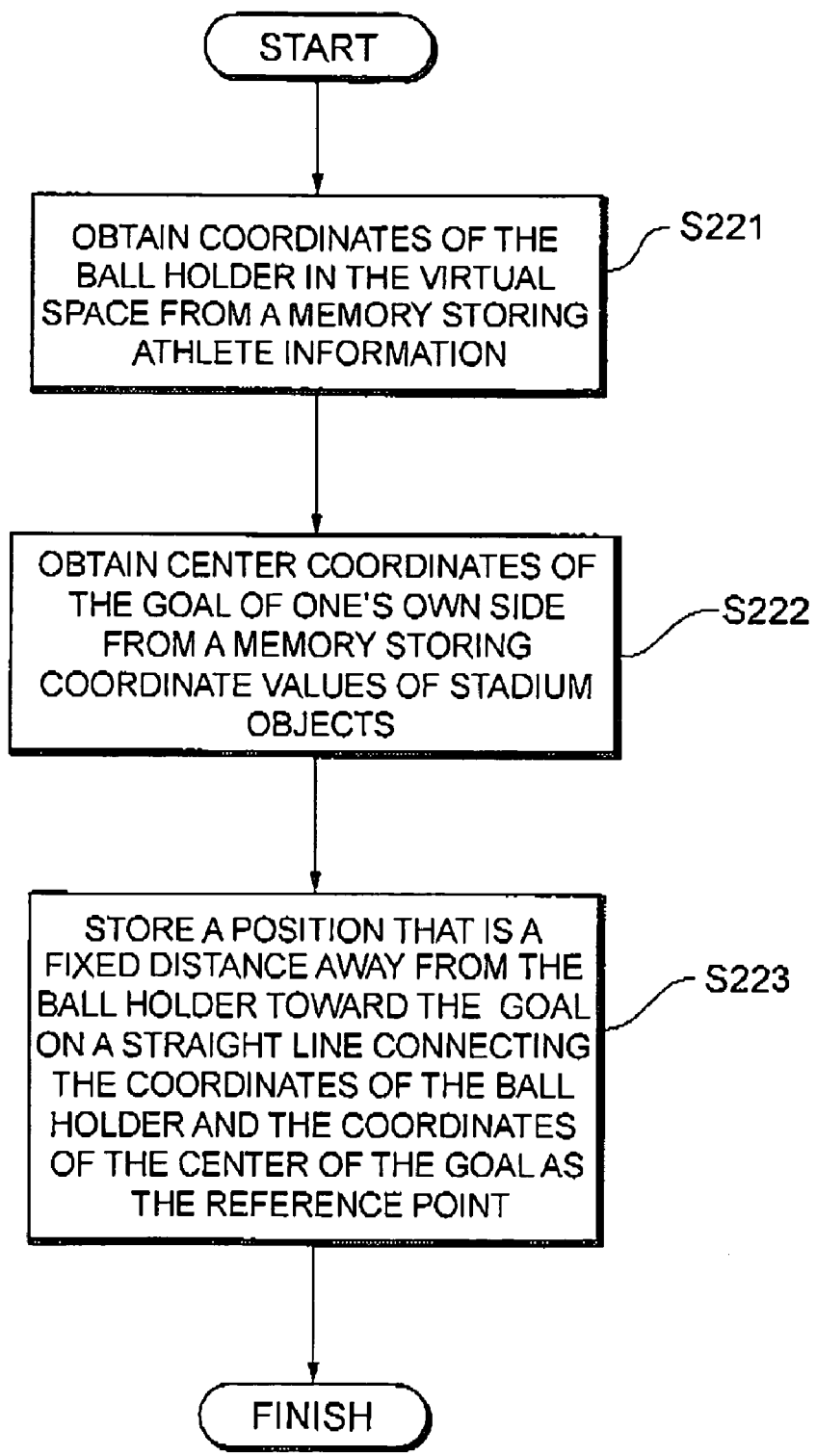
FIG. 22 is a flowchart showing a process of deciding the target reference point.

Furthermore, description is given regarding a flow for deciding the target reference point 25 with reference to FIG. 22. First, as shown in FIG. 22, coordinates of the ball holder (the athlete in possession of the ball) in the virtual space are obtained from a memory storing athlete information (S221), then center coordinates of the goal of that side (one's own team) are obtained from a memory storing coordinates of stadium objects (S222), and a position that is a fixed distance away from the ball holder toward the goal on a straight line (course line) connecting the coordinates of the ball holder and the coordinates of the center of the goal is stored in a memory as the target reference point (S223).

Next, as shown in FIGS. 1 and 2, a distance between the target reference point 25 and the self-character 20 is obtained (step S6) and a determination is performed as to whether or not this is inside the delay defense area 27 (step S7). That is, a determination is performed as to whether or not the distance between the target reference point 25 and the self-character 20 is 2 m or less. If this is not within the delay defense area 27 (2 m or less), [the self-character] moves toward the target reference point 20 (step S8). If this is within the delay defense area 27, a transition is made to an action within the delay defense area 27 (at the delay position) (step S9).

With the present embodiment, the movement destination of the self-character during defense is indicated as a region referred to as the delay defense area, and therefore a realistic game can be carried out.

For example, during defense, it is also possible to press the aforementioned button 33b and carry out an indication to move toward the ball, and although moving directly toward the ball has an advantage in that it is possible to recapture the ball, there is a risk that this defense will be evaded and left behind in the direction of the goal.

On the other hand, in order to make the defense more difficult to evade, it is possible to use the above described direction keys 31 to cause the self-character to move to an effective defense position maintaining a fixed distance from the ball holder, but in this case operation of the controller becomes complicated. Consequently, the movements of the ball holder cannot be followed and effective defense cannot be carried out.

In contrast to this, with the present embodiment, the movement destination of the self-character during defense is indicated as a region referred to as the delay defense area, and therefore a fixed distance can be maintained from the ball holder, and this defense can be made more difficult to evade.

Furthermore, the indication for movement extending to this region is carried out in response to a single operation of the input portion involving pressing the button 33c, and therefore it is possible to achieve more convenient operation for the player. Moreover, this enables rapid operation for the player and enables image processing to be carried out in response to this.

Next, description is given regarding actions inside the delay defense area 27 (step S9). After reaching inside the delay defense area 27, defense is carried out inside this area. Here, a determination is performed as to whether or not there is input from the direction keys 31 (step S10) and when there is input from a direction key, the target point for that movement is reset to a position that is a fixed distance away from the target reference point in the direction of the input from that direction key (step S11). Here, the specific direction of movement of the self-character depends on a position of the camera (camera direction).

FIG. 4 is a diagram illustrating a relationship between camera direction and direction of movement of the self-character.

Figure 4A:
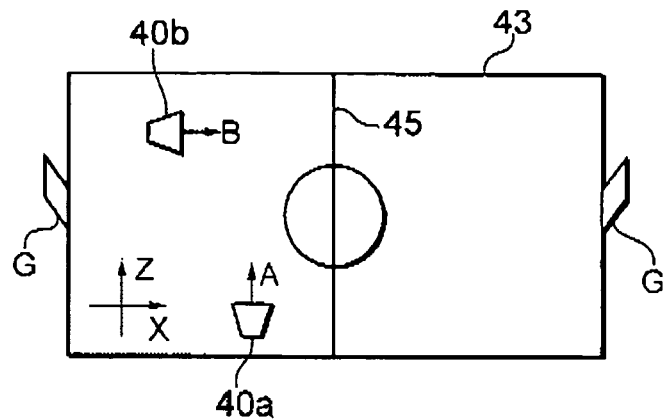
FIG. 4(a)-FIG. 4(c) shows a diagram illustrating a relationship between camera direction and direction of movement of the self-character.
Figure 4B:
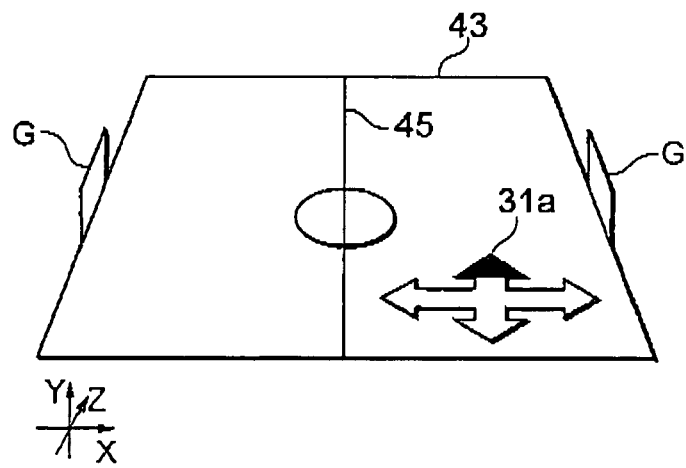

As shown in FIG. 4(a), when a camera 40a inside a virtual space (field) 43 is facing in an A direction, the virtual space is displayed by setting the camera so that a centerline 45 is vertical as shown in FIG. 4(b). Here, when the up direction key (31a) is pressed, the self-character moves in an upward direction in the diagram.

Figure 4C:
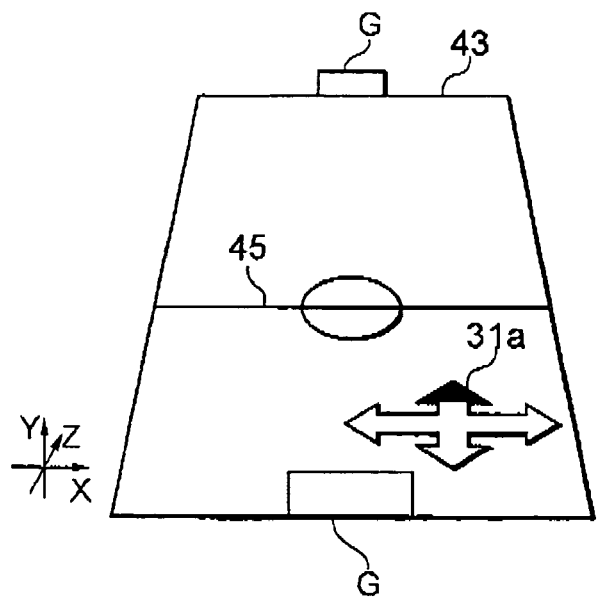

As shown in FIG. 4(a), when a camera 40b inside the virtual space (field) 43 is facing in a B direction, the virtual space is displayed by setting the camera so that the centerline 45 is horizontal as shown in FIG. 4(c). Here, when the up direction key (31a) is pressed, the self-character moves in an upward direction in the diagram.

Figure 21:
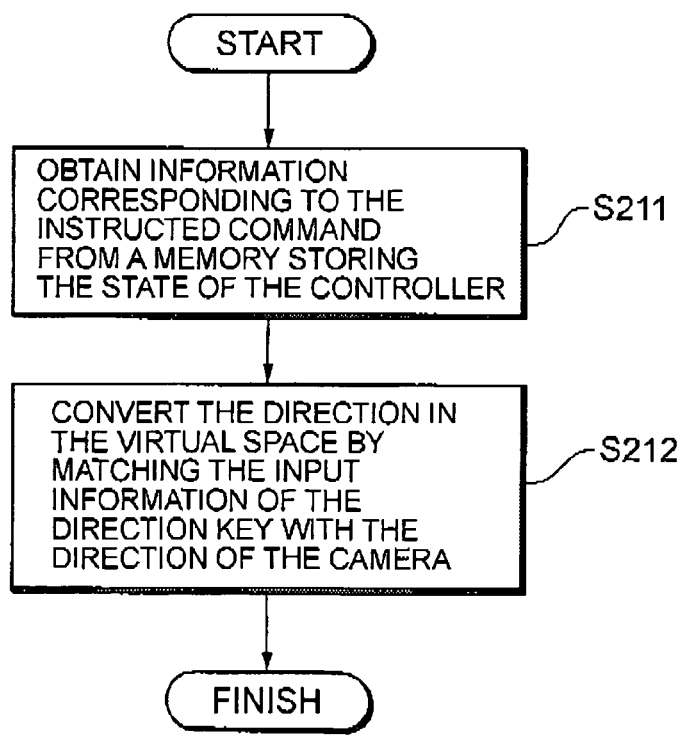
FIG. 21 is a flowchart showing obtaining input information from the controller.

As shown in the flowchart of FIG. 21, obtaining input information of the controller here is carried out by first obtaining information corresponding to the instructed command from a memory storing the state of the controller (S211), then converting the direction in the virtual space by matching the input information of the direction key with the direction of the camera (S212).

In this manner, by making the movement direction of the self-character correspond to the game images that are portrayed, indicating the movement of the self-character can be carried out visually and easily.

Furthermore, with the present embodiment, movement is enabled within the delay defense area in response to key operation after reaching the delay defense area 27, and therefore effective defense can be carried out.

For example, when defense is carried out toward the left inside the area and the ball holder attempts to go around on the right, actions such as putting out a leg while moving rightward can be carried out. As a result, the ball can be recaptured. Also, the ball can be made a loose ball by carrying out a tackle.

Figure 5:
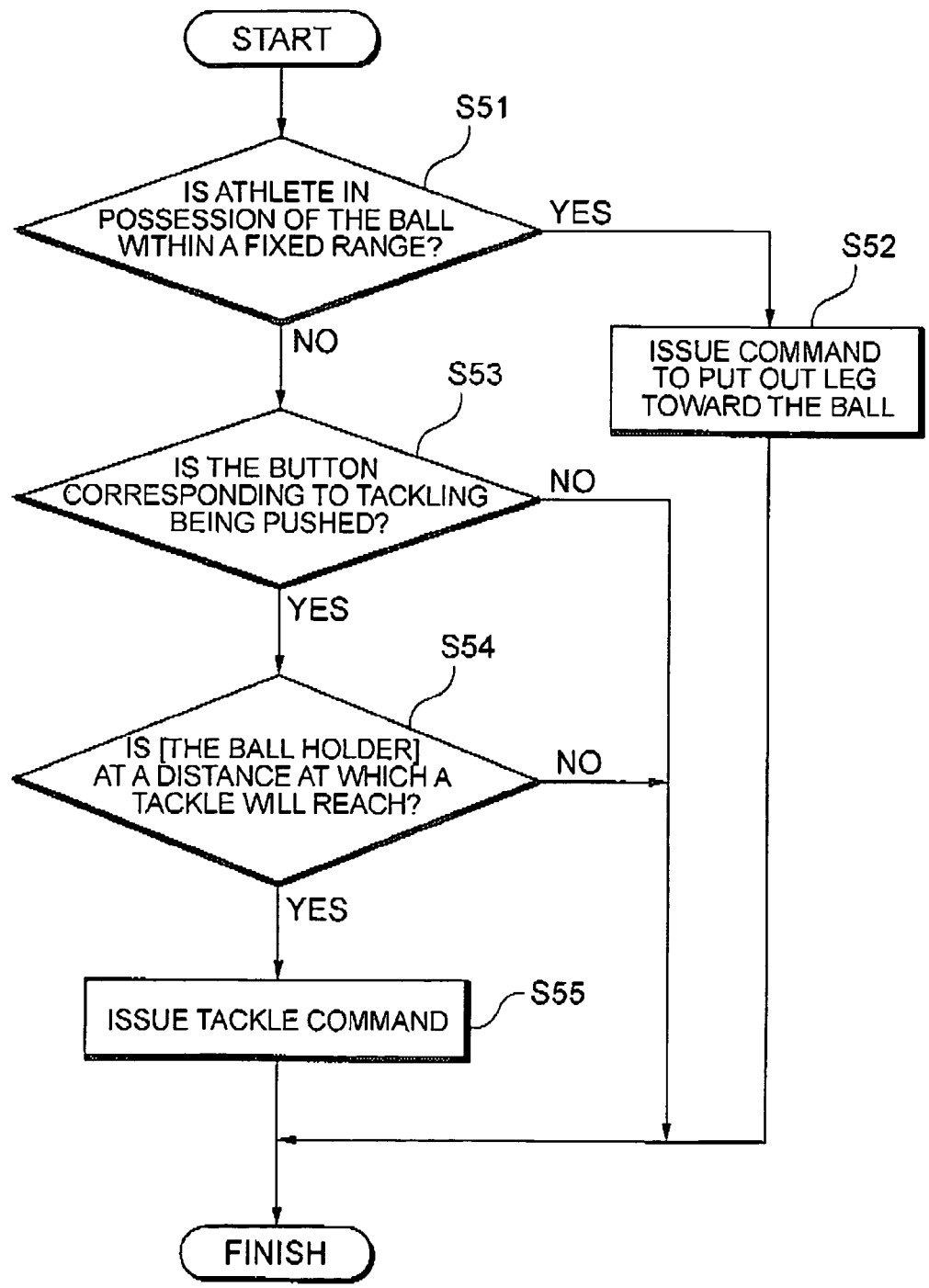
FIG. 5 is a flowchart showing one example of processing at a delay position.

FIG. 5 is a flowchart showing one example of processing at the delay position, and shows a flow for processing the aforementioned putting out a leg action and tackling.

After the self-character has reached the delay position, the CPU determines for example whether or not the ball holder is within a fixed range as shown in FIG. 5 (step S51). The fixed range referred to here is a narrow range that is narrower than a range in which tackling is possible for example, and which the self-character can reach without putting out a leg. When the ball holder is within this range, a command to put out a leg toward the ball is issued for example automatically by the CPU or in response to an operation by the game player (step S52). When the ball holder is not within this range, a determination is performed as to whether or not the button corresponding to tackling is being pressed (step S53). If the button corresponding to tackling is not being pressed, the present process finishes. If the button corresponding to tackling is being pressed, a determination is performed as to whether or not [the ball holder] is at a distance in which a tackle will reach (step S54), and if [the ball holder] is at a distance in which a tackle will reach, a tackle command is issued (step S55). If [the ball holder] is not at a distance in which a tackle will reach, the present process finishes.

In this manner, with the present embodiment, the indication for movement until the delay defense area is made in response to a single input operation involving pressing the button 33c, and therefore movement of the self-character to within the delay defense area can be achieved in response to an operation of the direction keys 31. As a result, various selections of defense positions can be made and maneuvering against the ball holder can be enjoyed Furthermore, [the game player] can gage a timing for putting out a leg to the ball and a timing for tackling, and a more realistic game can be enjoyed. Furthermore, the self-character can be caused to move intricately.

It should be noted that the button 33c is pressed continuously during the present process. Consequently, in addition to the pressing of the button 33c, indications for movement within the delay defense area are operated by the direction keys 31. Of course, processing may also be carried out in response to a short-period pressing of the button 33c.

Furthermore, in the present embodiment, the distance between the target reference point 25 and the ball holder BH is set to 3 m and a radius of the delay defense area 27 is set to 2 m, but this can be varied as appropriate such as setting the distance between the target reference point 25 and the ball holder BH is set to 3.5 m and the radius of the delay defense area 27 to 3 m.

Furthermore, numerical values such as these may be fixed regardless of the state or characteristics of the ball holder BH and may be variable according to the state or characteristics of the ball holder BH. Examples of the state of the character (athlete) include coordinates of the athlete in the virtual space, the direction the athlete is facing, motion during playback and playback position (frame), whether or not [the character] is in possession of the ball, a role of the athlete (such as marking, following, and covering), and a target position of the athlete. Examples of athlete characteristics include running speed (running ability).

The size and the target reference point of the delay defense area may be varied in response to the state and characteristics of the athlete such as these. For example, the target reference point may be changed in response to the distance between the ball holder BH and the goal such that the target reference point 25 is set to a position farther from the ball holder BH for distances that are larger (farther)

Figure 6:
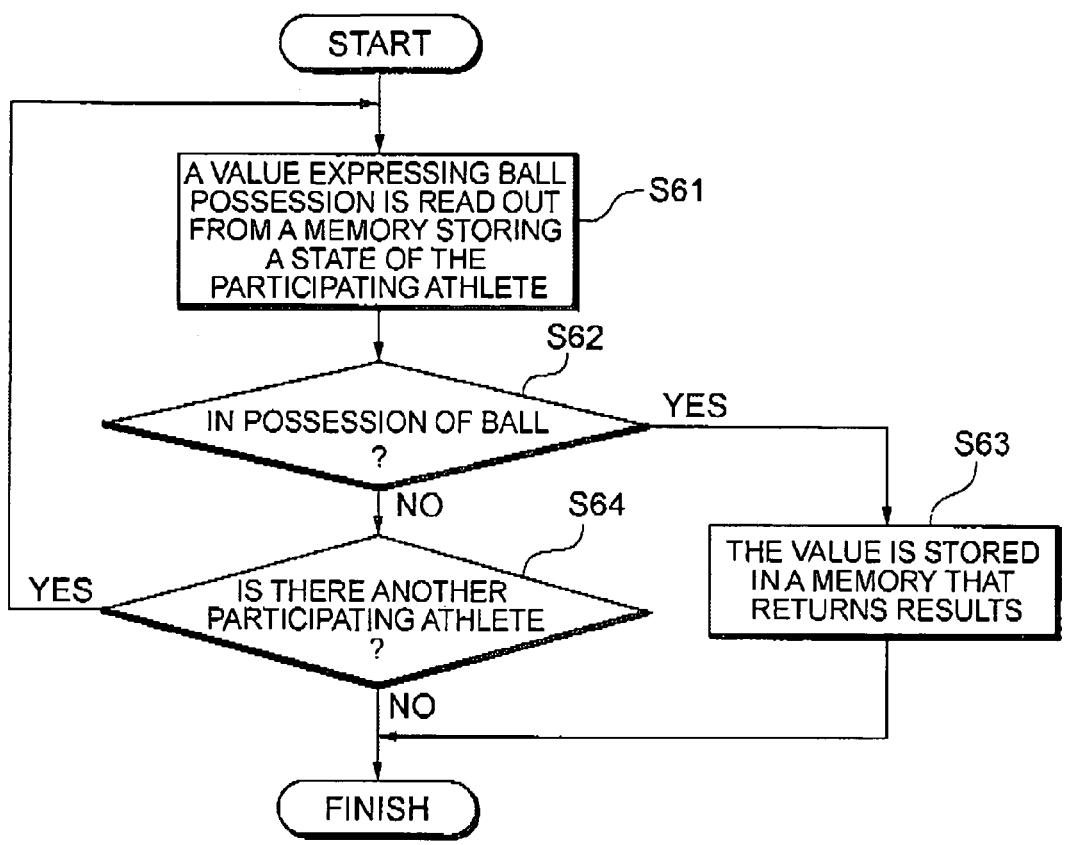
FIG. 6 is a flowchart of a process of checking a state or the like of an athlete.

FIG. 6 shows a flowchart of a process of checking a state or the like of an athlete. As shown in FIG. 6, a value expressing ball possession is read out from a memory (for example, the system memory shown in FIG. 10) storing a state or the like of a participating athlete (step S61). Next, for example, the CPU determines whether or not the ball is in possession [of the athlete] (step S62) and if the ball is in possession [of the athlete], the value is stored in a memory that returns results (step S63). If the ball is not in possession [of the athlete], a determination is performed as to whether or not a participating athlete is somewhere else (step S64), and if a participating athlete is somewhere else, [the procedure] returns to step S61. If there is no participating athlete anywhere else, processing finishes.

In this manner, based on the process of checking the state or the like of the athletes, if a value is read out corresponding to the target reference point or the delay defense area that is set in advance for each opponent athlete for example, defense can be carried out in response to the state or characteristics of the ball holder, and a more realistic game can be enjoyed.

In the present embodiment, the self-character is caused to move directly to the delay defense area during defense, but it is also possible to divide the movement process into two stages so that, for example, after causing [the self-character] to move to within a first target area, the [self-character] is caused to move to the delay defense area.

Figure 7:
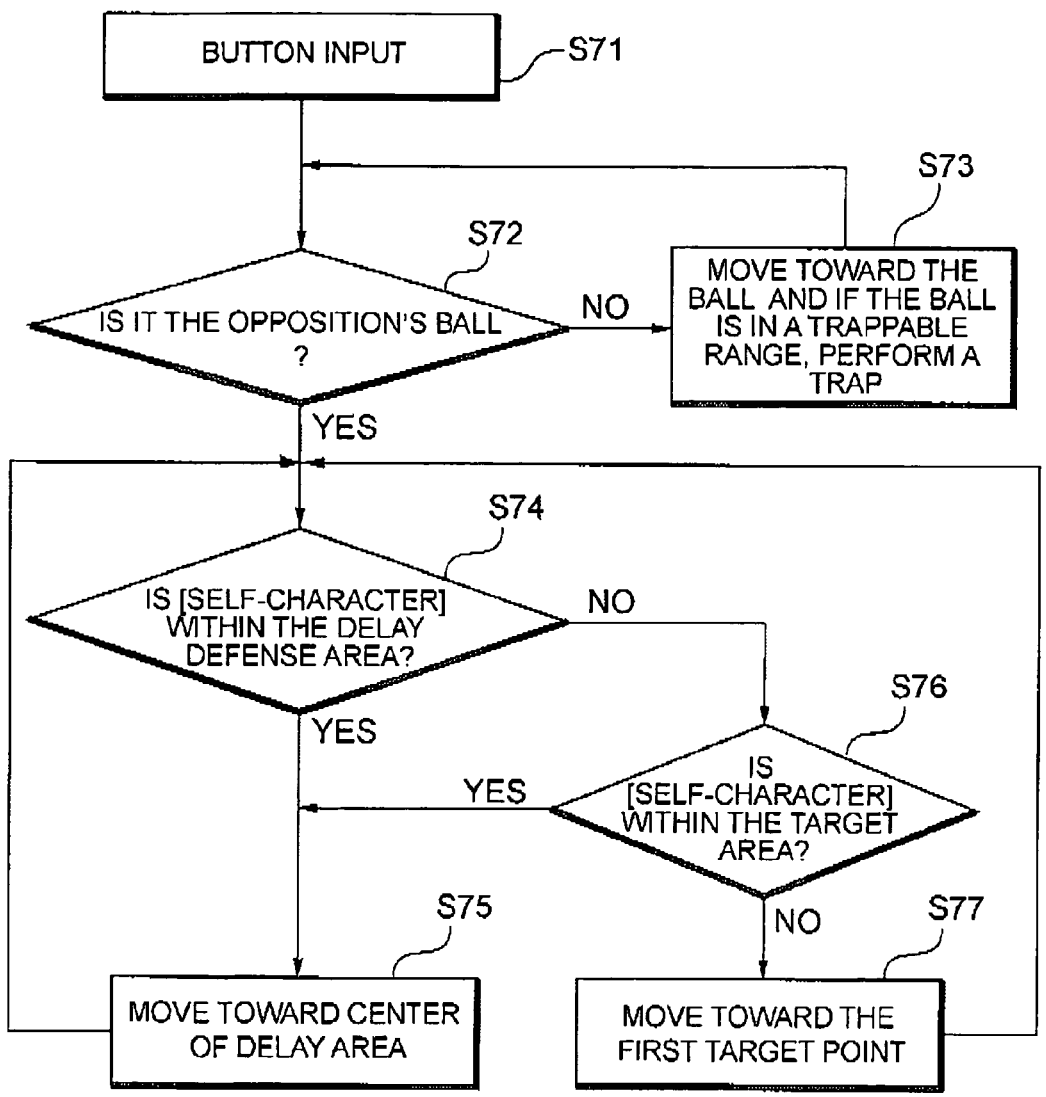
FIG. 7 is a flowchart showing another movement process of a character according to embodiment 1.
Figure 8:
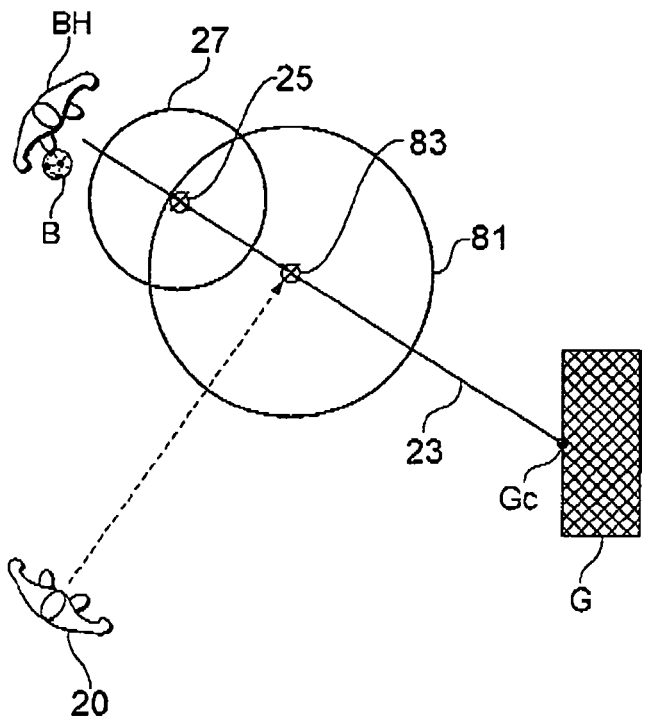
FIG. 8 is a schematic diagram showing an outline of a movement process of a character according to embodiment 1.
Figure 9:
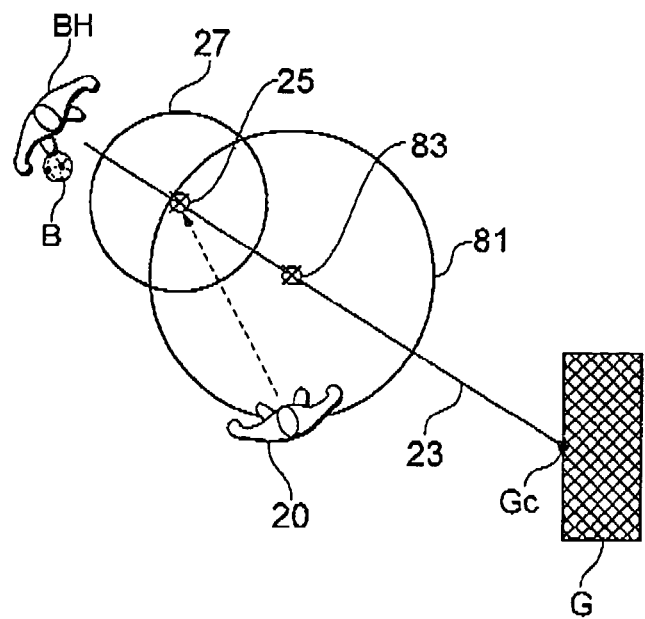
FIG. 9 is a schematic diagram showing an outline of another movement process of a character according to embodiment 1.

FIG. 7 is a flowchart showing another movement process of a character according to the present embodiment. FIG. 8 and FIG. 9 are schematic diagrams showing an outline of other movement processes of a character according to the present embodiment.

As shown in FIGS. 7 to 9, when the delay defense button is pressed (step S71), for example the CPU determines whether or not it is the ball of the opposing team (opponent characters) (step S72). If it is not the opposing team's ball (when it is a loose ball), movement is performed toward the ball B and if the ball is in a trappable range, a trap is performed (step S73) If it is the opposing team's ball, a determination is performed as to whether or not [the self-character] is within the delay defense area 27 (step S74). If [the self-character] is within the delay defense area, [the self-character] moves toward a center (the target reference point 25) of the delay defense area (step S75). If [the self-character] is not within the delay defense area, a determination is performed as to whether or not [the self-character] is within a first. target area 81 (step S76), and if [the self-character] is not within the first target area 81, [the self-character] moves toward a first target point 83 (step S77, FIG. 8). If [the self-character] is within the first target area 81, for example, [the self-character] moves toward the center (25) of the delay defense area (step S75, FIG. 9).

Here, the first target point 83 is on the course line 23 connecting the ball holder BH and the central point Gc of the goal line of the goal G, and is a position that has been set appropriately according to the goal G from the target reference point 25, which is the center of the delay defense area, for example, a position that is 6 m from the ball holder BH. Furthermore, the first target area refers to a region that is a first distance from the first target point and for example a radius of this area is set larger than a radius of the delay defense area, for example, 3.5 m.

By dividing the movement process into two stages in this manner, defense can be performed by entering a forward direction (substantially in front) of the ball holder BH. Furthermore, [the self-character] can enter as though coming around the forward direction (substantially in front) of the ball holder BH, and effective defense can be carried out.

Figure 10:
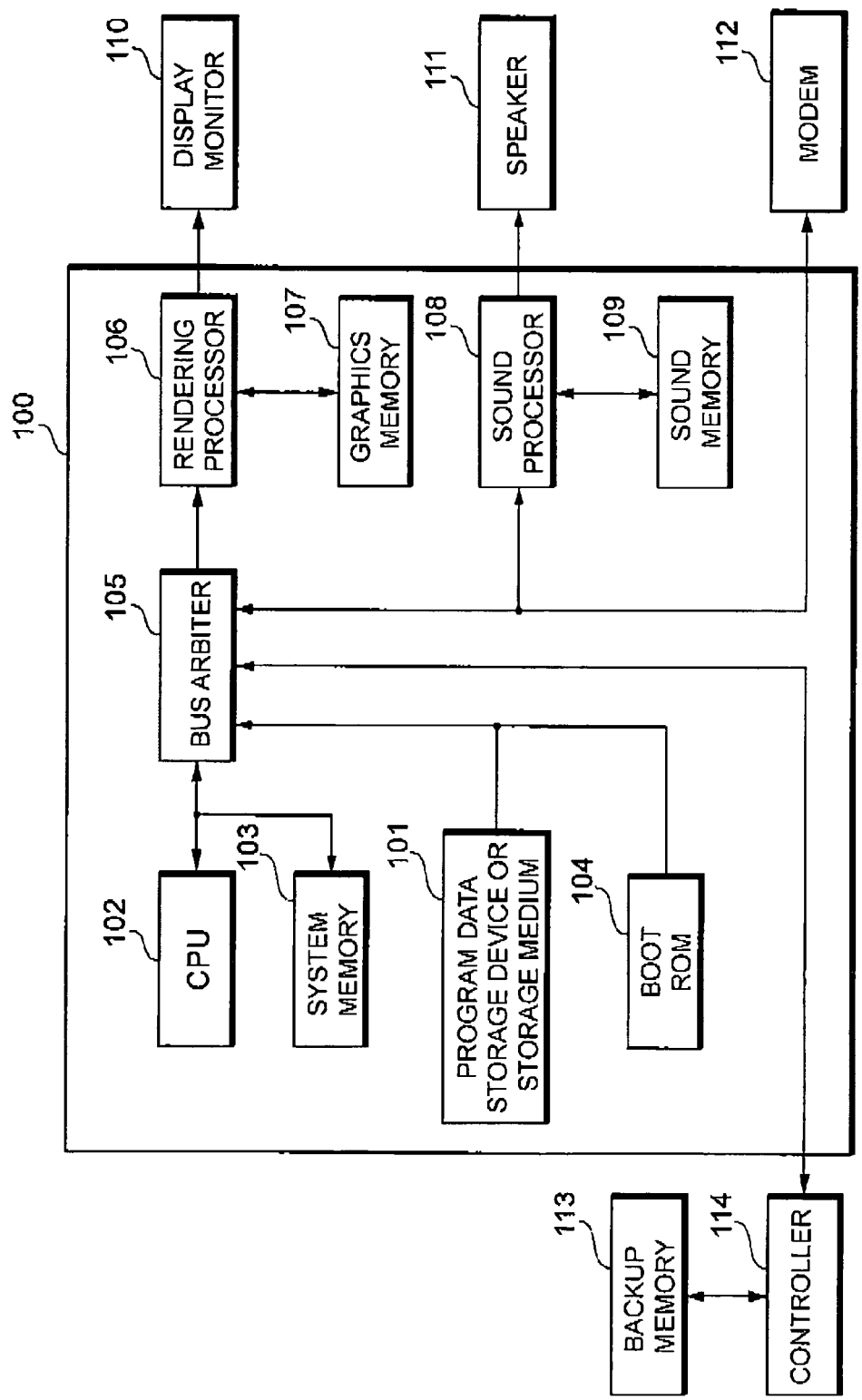
FIG. 10 is a block diagram of a game device that can carry out an image processing technique according to embodiment 1.

Next, description is given regarding an example of a game device in which the image processing technique according to the present embodiment can be carried out. FIG. 10 is a block diagram of a game device that can carry out an image processing technique according to the present embodiment. A game device 100 is provided with a program data storage device or storage medium (including for example an optical disk and optical disk drive) 101 in which the game program and data (including images and music data) are stored, a CPU 102 for carrying out such tasks as execution of the game program, overall control of the system, and coordinate calculations for image display, a system memory 103, a boot ROM 104 for storing programs and data necessary for the CPU 102 to carry out processing, and a bus arbiter 105 for controlling the flow of programs and data between the various blocks of the game device 100 and externally connected devices, with these [components] being connected respectively on a bus.

A rendering processor 106 is connected to the bus and video (movie) data read out from the program data storage device or storage medium 101 and images to be generated in response to operation by the game player or progress of the game are displayed on a display monitor (display means) 110 by the rendering processor 106. Graphics data and the like necessary for the rendering processor 106 to perform image generation are stored in a graphics memory (frame buffer) 107.

A sound processor 108 is connected to the bus and music data read out from the program data storage device or storage medium 101 and sound effects and voices to be generated in response to operation by the game player or progress of the game are output from a speaker 111 by the sound processor 108. Sound data and the like necessary for the sound processor 108 to generate sound effects and voice are stored in a sound memory 109.

A modem 112 (there is no limitation to a modem and this may be a network adaptor or the like as long as it is a device connectable to a network) is connected to the game device 100 and the game device 100 can communicate with other game devices 100 and a network server through the modem 112 and a telecommunications line (not shown in drawings). Also connected to the game device 100 are a backup memory 113 (which includes disk storage media and storage devices) in which information concerning the game at a midway process and program. data inputted and outputted via the modem 112 are stored, and a controller 114 that inputs into the game device 100 information for controlling the game device 100 and externally connected devices in accordance with operation by the game player (operator). It should be noted that although the backup memory 113 is connected to the game controller 114, it may be connected to the game device main unit or built into the game device main unit. The controller 114 corresponds to the controller described with reference to FIG. 3 for example.

The CPU 102 in the game device 100 processes data for electronic amusement based on operation signals (operation data) from an operation terminal as operation means enabling operation by the game player and a game program, and is configured provided with a function as a data processing device for executing a process in which a result of this processing is outputted.

Accordingly, the image processing technique of the present embodiment is recorded as a game program on a storage medium such as a DVD, CD-ROM, or a game cassette for example, and the CPU 102 processes data based on this program and inputted operations (operation signals and operation data from the operation terminal) of the game player and outputs the processing result.

Furthermore, an image processing and computation process unit is constituted by the CPU 102 and the rendering processor 106. It should be noted that the units described here as structural portions of the game device 100 may be divided off to other game devices or servers. An electronic amusement system, that is, a game device according to the present invention, may be achieved by a game player side game device terminal and a server.

Regarding Loose Balls

Here, in the present embodiments a delay defense process was carried out with respect to the ball holder (the athlete in possession of the ball), but the delay defense process may also be carried out in the case of a loose ball.

Figure 24:
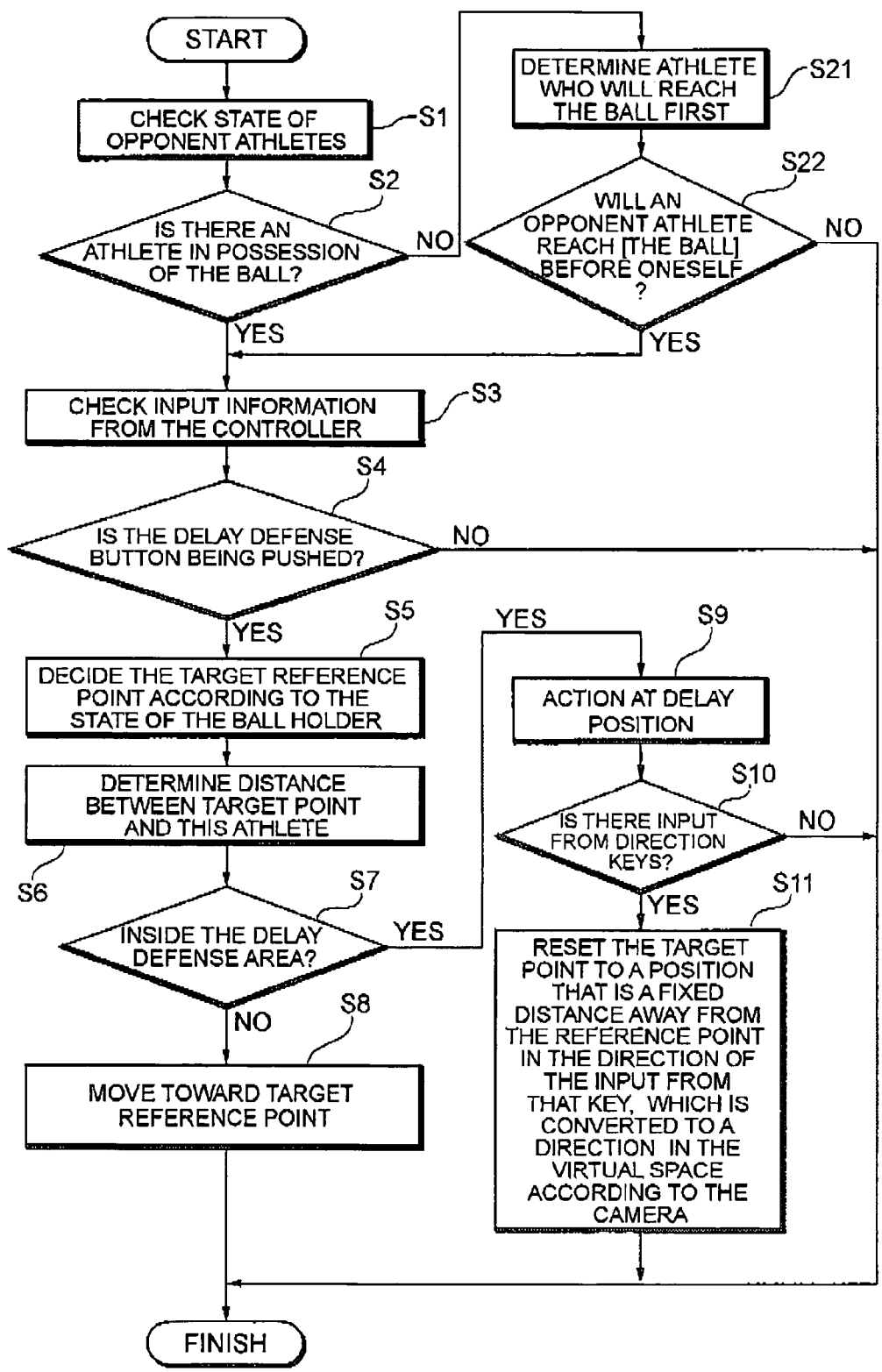
FIG. 24 is a flowchart showing another movement process (image processing technique) of a character according to embodiment 1.

FIG. 24 is a flowchart showing another movement process (image processing technique) of a character according to the present embodiment.

It should be noted that steps 1 to 11 are the same as the flowchart in FIG. 1 and therefore detailed description thereof is omitted. For example, as shown in FIG. 24, a CPU (see FIG. 10) inside the game device checks a state of the opponent athletes (step S1) and determines whether or not there is an athlete among the opponent athletes who is in possession of the ball (step S2). In a case where there is no athlete in possession of the ball among the athletes (including one's own athletes), that is, in the case of a loose ball, a determination is performed as shown in step S21 as to which (opponent) athlete is first to reach the ball. This determination involves calculating the time for each athlete to be able to reach the ball according to such factors as the distance between the ball and each athlete, the speed of the ball, and the running ability of each athlete, then judging the magnitudes thereof. It should be noted that the distance between the ball and each athlete is obtained from the coordinate values of the athlete objects and the ball object.

Next, a determination is performed as to whether or not the opponent athlete will reach the ball before the self-character (oneself) (step S22), and in a case where [the opponent athlete] will reach [the ball first] (YES), [the procedure] proceeds to step S3. If [the opponent athlete] will not reach [the ball first], the present process finishes.

Here, the determinations of steps S3 to S11 are carded out in a case where the opponent athlete will reach the ball before the self-character (oneself), but the target reference point of step S5 is set in a following manner.

Namely, a course line connecting the ball (loose ball) and a specific position (reference point) in the goal is set, then a point thereon that is a first distance, for example 3 m, from the ball is set as the target reference point. A region located separated from the target reference point by a second distance, for example, 2 m, is set as the delay defense area.

Other than the setting of the target reference point, the flow here is the same as in FIG. 1 and therefore description thereof is omitted.

It should be noted that in a case where the distance is short between the ball and the opponent athlete who will reach the ball first (a fixed distance or less), the same processing as in step S5 of FIG. 1 may be carried out by selecting this athlete as the ball holder. Furthermore, the same processing as in step S5 of FIG. 1 may be carried out by selecting a target of a pass from the ball holder (opponent athlete) as the ball holder.

In this manner, a delay defense process may be carried out with respect to the ball and opponent athletes who are attempting to stay in possession of the ball. In this case, the ball itself may be set as a starting point of the course line, and it may also be the opponent athlete.

With this process, [the self-character] is able to swiftly enter a delay defense area with respect to the ball and opponent athletes who are attempting to stay in possession of the ball, and defensive positions can be established. As a result, an effective defense can be carried out.

CPU versus CPU

Here, the present embodiment was described assuming "CPU versus game player (self-character)," but the delay defense (program, image processing technique) according to the present invention can also be applied in a case of "CPU versus CPU."

For example, the game player may become a coach who trains the athletes before a match (improves ability parameters of the athletes). In this manner a match is carried out between athletes (a team) who have been trained by oneself (the game player) and athletes (a team) who are caused to act by the CPU.

In this case, all of the athletes (both teams) are controlled by the CPU, and as a result a "CPU versus CPU" match is carried out. That is, no operational input (shooting commands and movement commands to the athletes) is received from the game player during this match.

When carrying out a "CPU versus CPU" match in this manner, the CPU first, (1) determines whether or not the "attacking CPU athletes" are in possession of the ball. (2) And when [the attacking athletes] are in possession of the ball, [the CPU] decides the "defending CPU athlete(s)" to carry out a delay defense. This decision involves, for example, determining the distances between the attacking CPU athlete and the defending CPU athletes, and selecting the defending the CPU athlete who is closest to the attacking CPU athlete.

Following this, (3) the defending CPU athlete is caused to move to a point of a specific distance from the attacking CPU athlete toward the direction of the goal. Specifically, the defending CPU athlete is caused to move to a target position that is positioned on a line connecting a reference point in the goal and the attacking CPU player (see steps S5 to S8 in FIG. 1).

Following this, (4) after reaching within the delay defense area, [the self-character] is operated (moved) within this area (see steps S9 to S11 in FIG. 1). Note, however, that in this case there is no input from the direction keys (step S10) by the game player, and the defending CPU athletes perform movements (defense) in accordance with commands from the CPU. Furthermore, in the processing at the delay position, there are actions such as putting out a leg, tackling and the like, which were described with reference to FIG. 5, and the commands for these are performed by the CPU. That is, the CPU determines such factors as the positional relationships among the attacking CPU athletes and the defending CPU athletes and their ability parameters, and determines whether or not to carry out actions such as putting out a leg, tackling and the like.

As described earlier, the distance (for example 3 m) between the target. reference point 25 and the ball holder BH and the radius (for example 2 m) of the delay defense area 27 can be varied as appropriate (see FIG. 2).

In particular, in a case of "CPU versus CPU," all the processing is carried out by the CPU and therefore there is no need to give consideration to convenience of operation for the game player, and detailed settings are possible in response to conditions and the state of the athletes.

For example, the target reference point is updated in response to the distance between the attacking CPU athlete and the goal. For example, a position farther away from the attacking CPU athlete may be set for larger (farther) distances between the attacking CPU athlete and the goal.

Furthermore, in the aforementioned example, as was described in (2), processing is performed for example such that the defending CPU athlete closest to the attacking CPU athlete is selected and the delay defense is carried out, but it is also possible to add further conditions such as "carry out the delay defense when the dribbling speed of the attacking CPU athlete is above or below a fixed [speed]."

Furthermore, delay defense processing may be carried out not only for the attacking CPU athletes but also the defending CPU athletes. For example, this may be set so that a comparison is performed on the numbers of attacking CPU athletes and defending CPU athletes in the defending area (for example, one's own half of the field), and in a case where there is a greater number of attacking CPU athletes, the attacking CPU athletes enter the delay positions of the defending CPU athletes.

Embodiment 2

In embodiment 1, the movement destination of the self-character during defense was indicated as a region referred to as the delay defense area, but in the present embodiment, description is given regarding a route (trajectory) of movement until a specified destination. It should be noted that items having same functions as in embodiment 1 are given same or related symbols and repetitive description thereof is omitted.

Figure 11A:
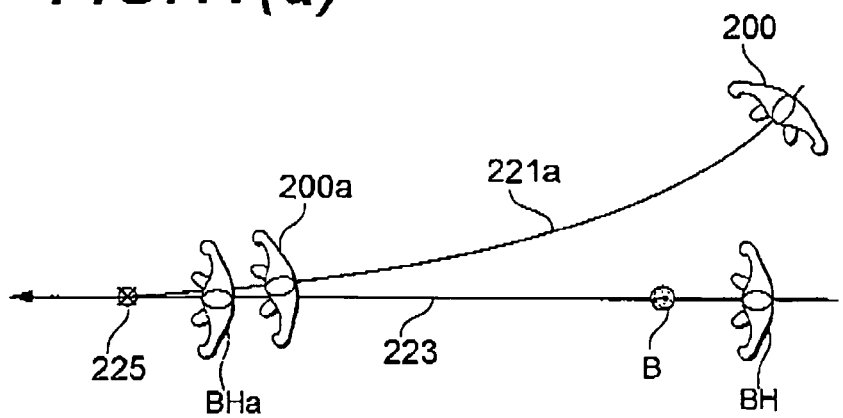
FIG. 11(*a*)-FIG. 11(*c*) shows a diagram showing a trajectory of movement of the self-character.
Figure 11B:
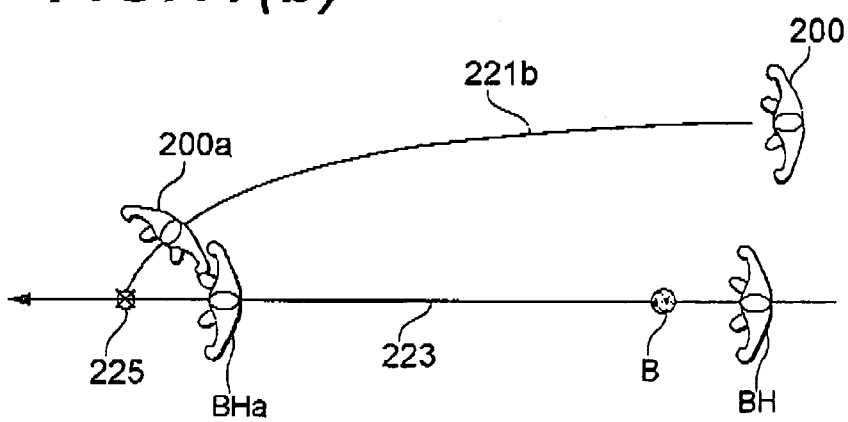
Figure 11C:
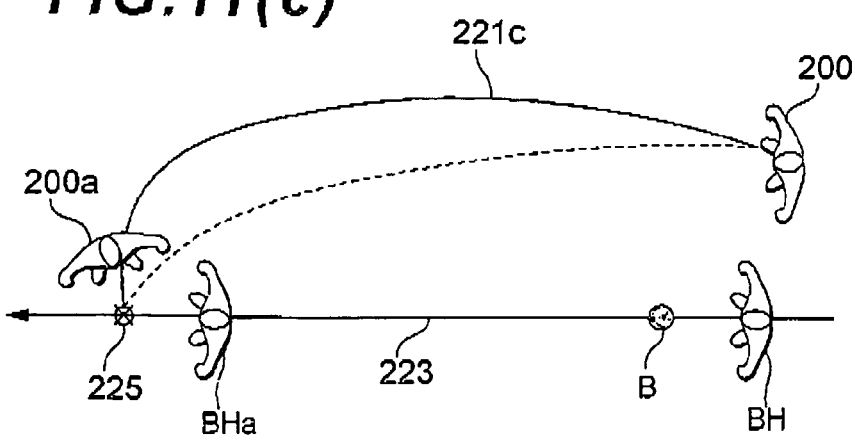

FIG. 11 is a diagram showing trajectories of movement of the self-character. For example, as shown in FIG. 11(*a*), when a self-character 200 is positioned behind the ball holder BH and an angle formed by a line connecting a target reference point 225 and the self-character 200 and a course line 223 is 30 degrees or less, it is easier for the self-character 200 to follow the ball holder BH from behind. In a case such as this, an effective defense cannot be carried out. [Symbol] B indicates the ball and [symbols] 200*a* and BHa indicate positions of the self-character 200 and the ball holder BH respectively after movement. Furthermore, [symbols] 221*a* to 221*c* indicate trajectories of movement of the self-character.

Accordingly, in the present embodiment, as shown in FIG. 11(*b*), the movement trajectory of the self-character 200 is set so that it comes in with the angle to the ball holder BH being increased near the target reference point 225. In other words, the trajectory of movement of the self-character is not a straight line, but is set to a substantial arc shape that bulges A movement such as this is referred to as a round run.

It should be noted that, as shown in FIG. 11(*c*), it is also possible to select a trajectory having a further increased angle, in other words, a trajectory in which the bulge is further enlarged. In this case, although the possibility of obtaining the ball is increased, [more] time is taken to reach the target reference point 225 since the movement distance is longer.

Figure 12:
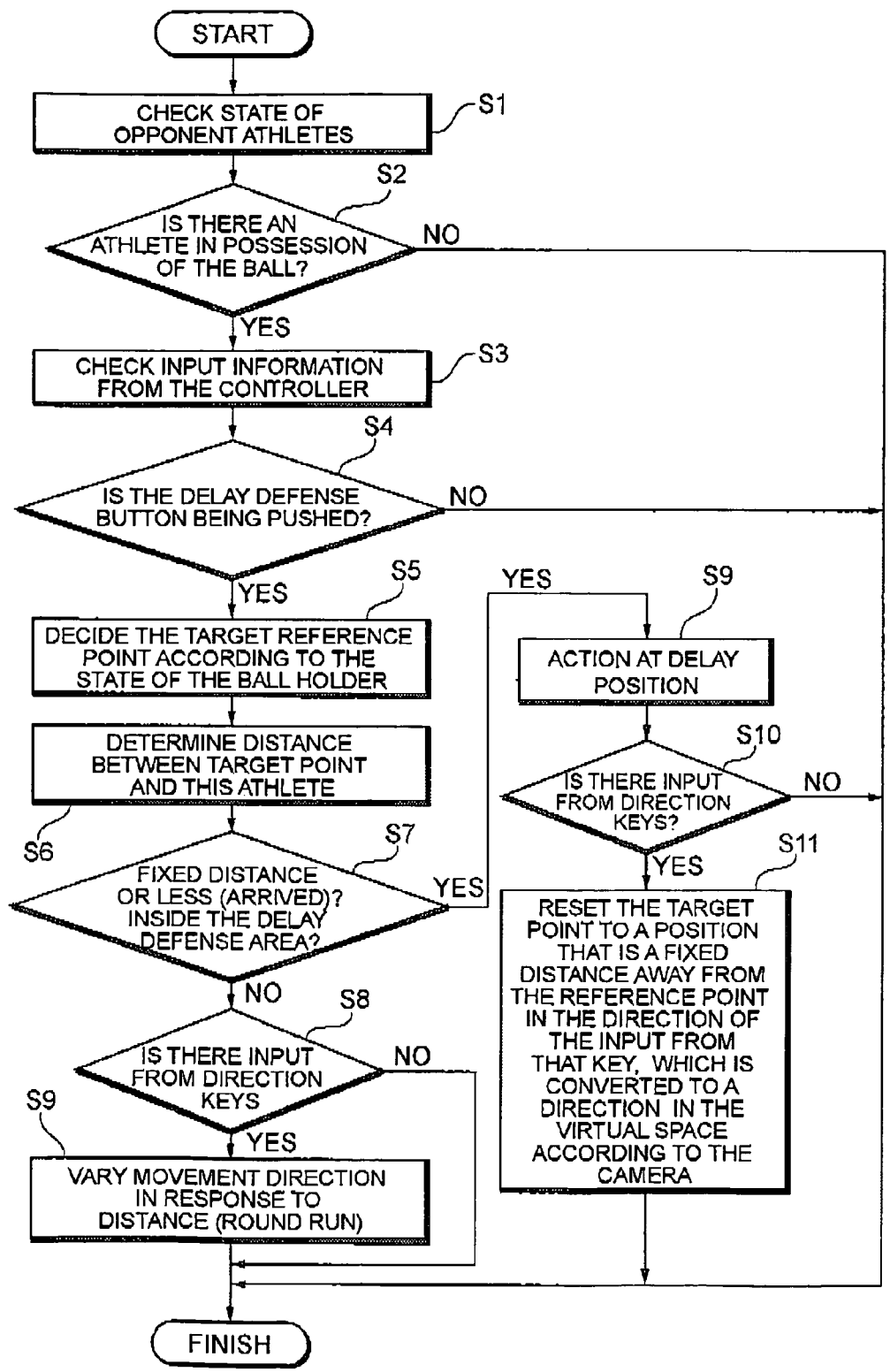
FIG. 12 is a flowchart showing a movement process (image processing technique) of a character according to embodiment 2.

FIG. 12 is a flowchart showing a movement process (image processing technique) of a character according to the present embodiment. It should be noted that in steps S1 to S6, the processing is the same as in embodiment 1, and therefore description thereof is omitted.

As shown in FIG. 12, the CPU for example obtains a distance between the target reference point 225 and the self-character 200 (step S6) and determines whether or not this is a fixed distance or less (step S27). That is, if [the distance] is not less than the fixed distance (for example 2 m), then this means the delay defense area has not been reached. Accordingly, in a case where this is not the fixed distance or less, a determination is performed as to whether or not there is input from the direction keys (step S28), and when there is input from the direction keys, a round run is carried out. As is described later in detail, the round run can be said to be a movement in which the movement direction is changed as appropriate in response to the distance between the target reference point 225 and the self-character 200.

Figure 13:
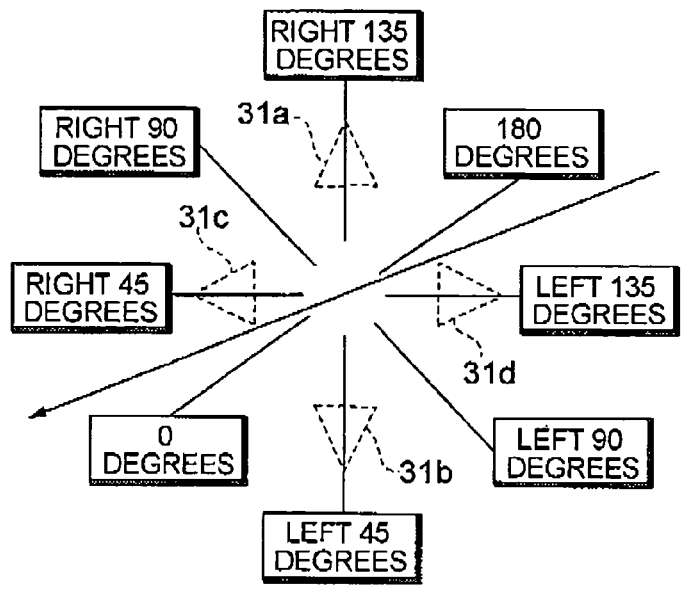
FIG. 13 is a diagram illustrating a relationship between the direction keys and movement direction.
Figure 14:
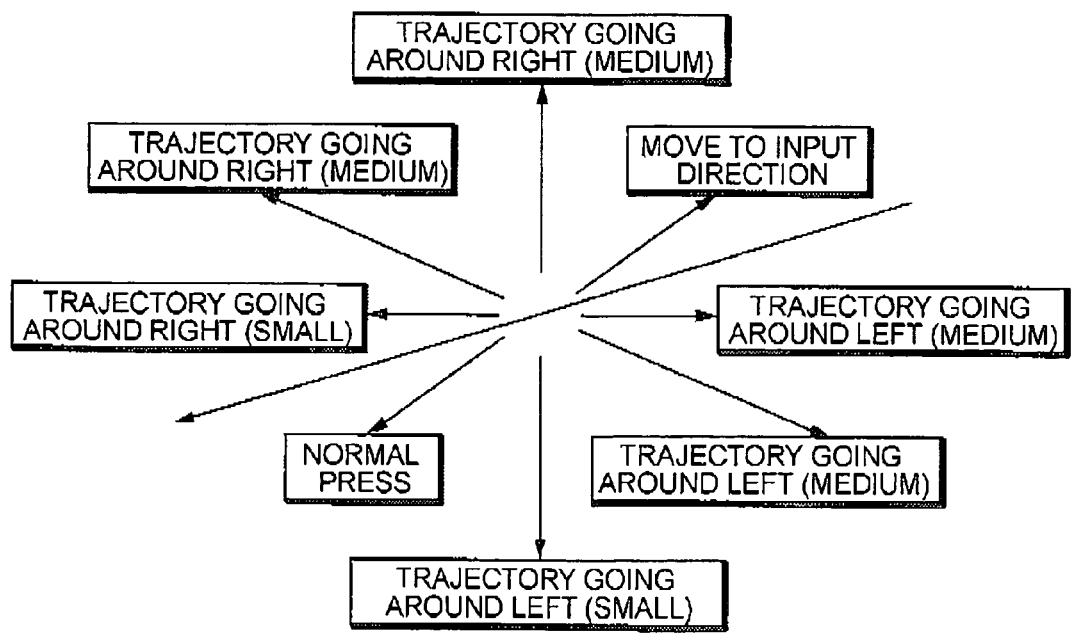
FIG. 14 is a diagram illustrating a relationship between the direction keys and movement trajectory.
Figure 15:
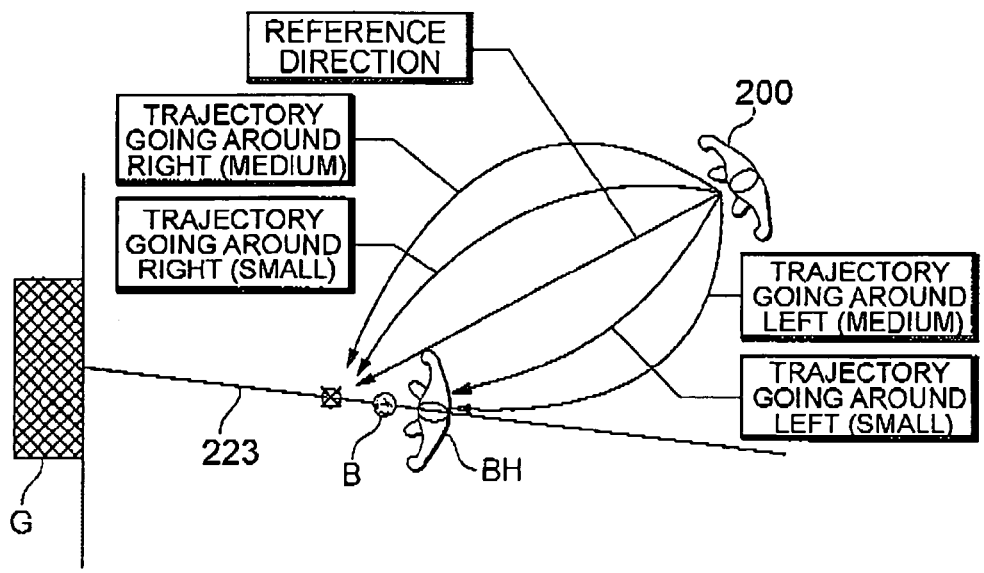
FIG. 15 is a diagram specifically illustrating movement trajectories.

FIG. 13 is a diagram illustrating a relationship between the direction keys and movement direction, and FIG. 14 is a diagram illustrating a relationship between the direction keys and movement trajectory. Furthermore, FIG. 15 is a diagram specifically illustrating movement trajectories. For example, as shown in FIG. 13, in a case where the target reference point is diagonally downward left 45 degrees with respect to the self-character (this direction is referred to as a reference direction, see FIG. 15), when the up direction key is pressed for example, right 135 degrees is selected and a trajectory that goes around the right is selected, which is a substantially arc shaped trajectory having a medium bulge. Furthermore, when the left direction key is pressed, right 45 degrees is selected and a trajectory that goes around the right is selected, which is a substantially arc shaped trajectory having a small bulge. Similarly, when the down direction key is pressed for example, left 45 degrees is selected and a trajectory that goes around the left is selected, which is a substantially arc shaped trajectory having a small bulge. Furthermore, when the right direction key is pressed, left 135 degrees is selected and a trajectory that goes around the left is selected, which is a substantially arc shaped trajectory having a medium bulge. FIG. 16 shows a relationship between movement direction and movement trajectory.

It should be noted that here, in a case where the up and left direction keys are pressed simultaneously, right 90 degrees is selected and a trajectory that goes around the right is selected, which is a substantially arc shaped trajectory having a medium bulge, thereby selecting a same trajectory as when the up direction key has been pressed. Furthermore, in a case where the down and right direction keys are pressed simultaneously, left 90 degrees is selected and a trajectory that goes around the left is selected, which is a substantially arc shaped trajectory having a medium bulge, thereby selecting a same trajectory as when the right direction key has been pressed. Left and right here are directions as viewed from the self-character.

Of course, trajectory options may be increased by varying the trajectory when the up and left direction keys are pressed simultaneously and when the up direction key has been pressed (for example, varying the extent of bulging). Furthermore, in the present embodiment the direction keys are used, but indications such as these can be carried out by using an analog key (see FIG. 3).

Furthermore, the extent of bulging ("small" or "medium") can be set as appropriate. Here, when the extent of bulging is "small," the displacement from the reference direction is set to approximately half of "medium."

Figure 17:
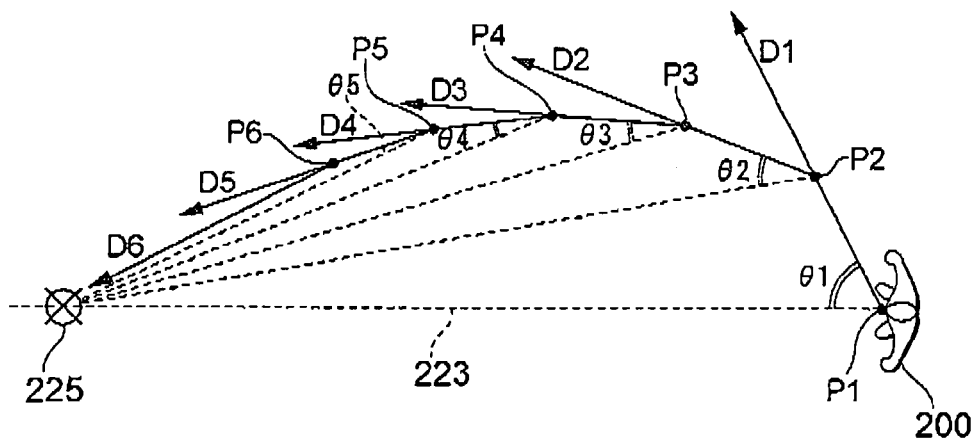
FIG. 17 is a diagram showing a relationship between displacement from a reference direction and movement trajectory.

FIG. 17 is a diagram illustrating a relationship between reference direction and direction of movement of the self-character. At an initial position P1 of the self-character, the movement direction of the self-character is D1, and an angle formed with the reference direction (the direction from the self-character 200 to the target reference point 225) is θ1. Following this, when the position of the self-character changes to P2, the movement direction of the self-character here becomes D2, and the angle formed with the direction from P2 to the target reference point 225 becomes θ2 (<θ1). In this manner, along with movements of the self-character (P2 to P6), and in accordance with the line connecting the self-character and target reference point 225 becoming shorter, the angles (θ2 to θ5) formed between this line and the movement directions (D2 to D6) become smaller. Finally, at position P6, the angle that is formed becomes zero degrees.

For example, when the extent of bulging is "medium," the distance to target reference point is 30 m and the maximum value of the angle formed is approximately 60 degrees. In accordance with the distance to the target reference point becoming shorter, the angle formed becomes smaller and, for example, when the distance to the target reference point is 6 m, the angle formed becomes zero degrees. When the extent of bulging is "small," the distance to target reference point is 30 m and the maximum value of the angle formed is approximately 30 degrees. In accordance with the distance to the target reference point becoming shorter, the angle formed becomes smaller and, for example, when the distance to the target reference point is 6 m, the angle formed becomes zero degrees.

Figure 23:
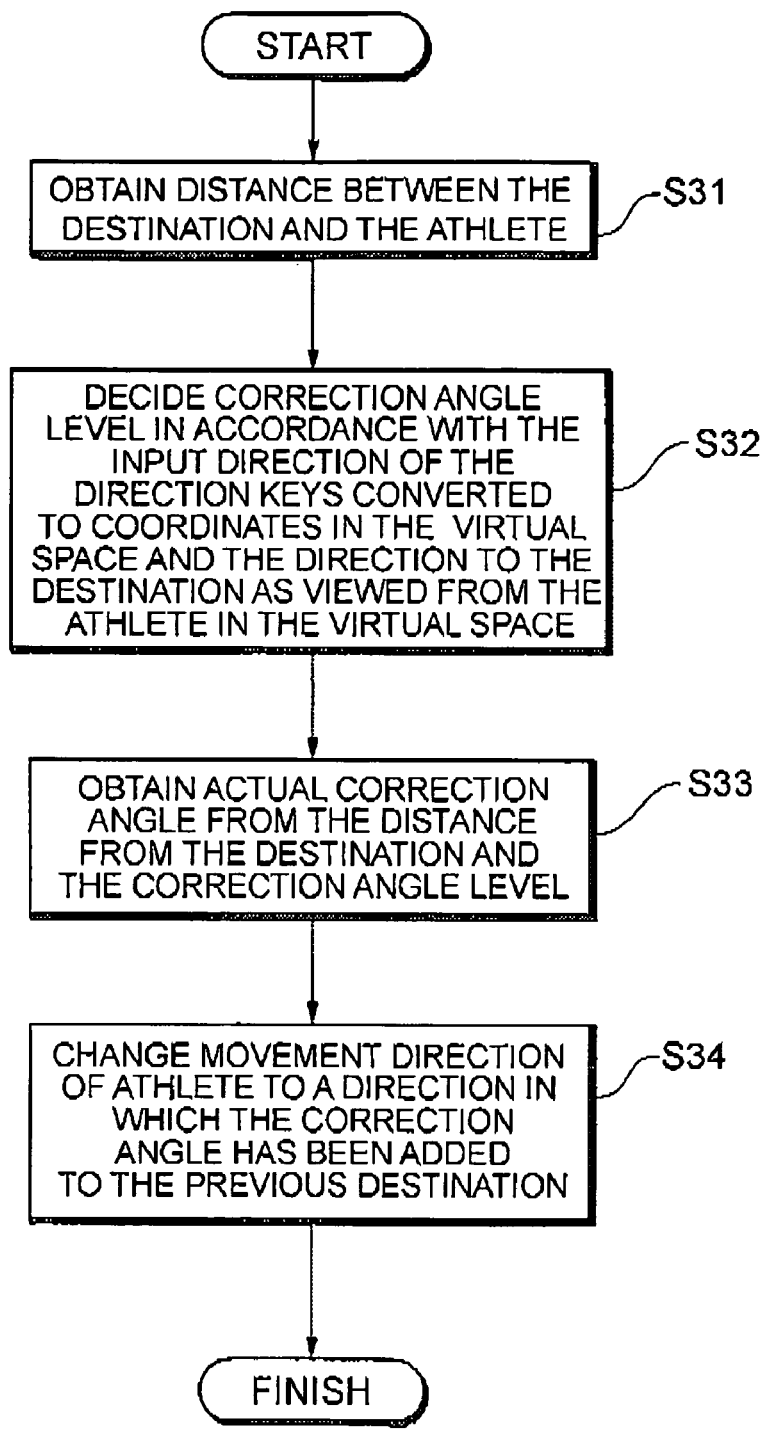
FIG. 23 is a flowchart showing round run processing.

FIG. 23 illustrates a processing flow of the round run. Here, the angle formed is a correction angle. As shown in FIG. 23, a distance is obtained between the target reference point (destination) and the self-character (the athlete) (step S31) Following this, a correction angle level is decided in accordance with the input direction of the direction keys converted to coordinates in the virtual space and the target reference point as viewed from the self-character in the virtual space (step S32). This step corresponds to selecting the extent of bulging as "medium" and the extent of bulging as "small" for example. Following this, an actual correction angle is obtained from the distance from the target reference point and the correction angle level (step S33). Specifically, the correction angle is calculated using a formula by which the correction angle becomes smaller for shorter distances. Following this, the movement direction of the self-character is changed to a direction in which the correction angle has been added to the direction to the target reference point (step S34).

In this manner, with the present embodiment, a more effective defense can be carried out by appropriately setting the movement trajectory of the self-character. For example, defense can be carried out by selecting a "medium" extent of bulging and moving so as to go around the ball holder. Furthermore, in case where a character of one's own team is already in the vicinity of the direction in which the ball holder is advancing, defense can be carried out by selecting a "small" extent of bulging and dosing in on the ball holder with the character of one's own team. In this manner, the form of defense can be varied as appropriate in response to conditions at each time, and a more realistic soccer game can be enjoyed.

Furthermore, the round run is effective in a case where an obstacle is present between [the self-character] and the target reference point, for example, when an opponent athlete is present. Furthermore, by carrying out a round run, the self-character can come in opposition to the ball holder, and the orientation of the body of the self-character be set to an orientation suited to defense.

Figure 18:
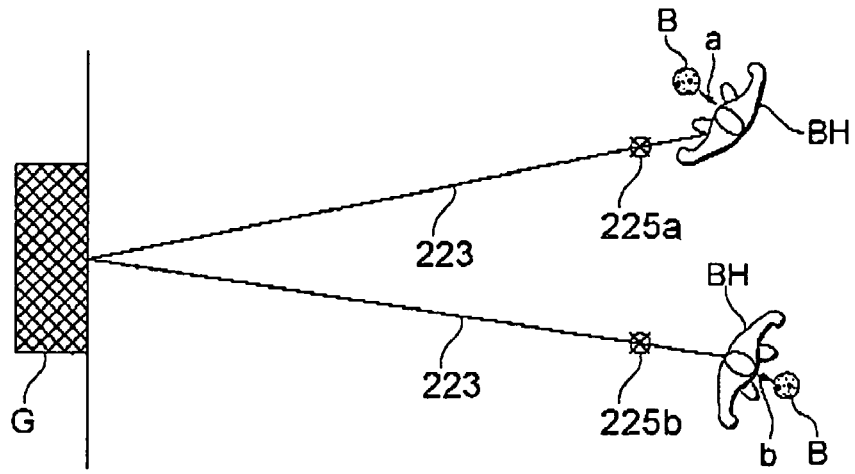
FIG. 18 illustrates a relationship between orientation of the ball holder and the target reference point.

Here, the target reference point is not changed by the movement state or the dribbling direction of the ball holder. FIG. 18 illustrates a relationship between orientation of the ball holder and the target reference point. As shown in the diagram, even when the orientation of the ball holder (dribbling direction) is an "a" direction or a "b" direction, the target reference point is set to a point (225*a*, 225*b*) on the course line. This is because if the target reference point was changed according to the movement state or dribbling direction of the ball holder, changes to the target reference point would be produced frequently, which would ultimately result in a condition being produced in which the ball could not be chased. This is also because the opponent athlete would be able to break free from the self-character easily by causing the target reference point to change frequently.

Figure 19A:
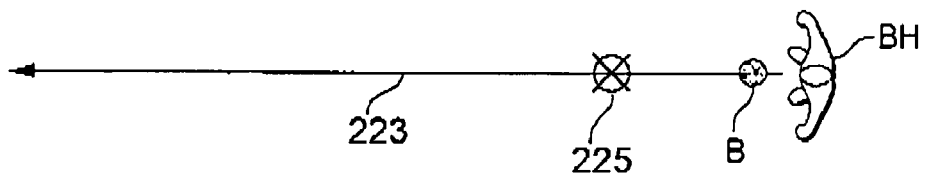
FIG. 19(*a*)-FIG. 19(*c*) shows a diagram illustrating a relationship between speed (dribbling speed) of the ball holder of the ball holder and the target reference point.
Figure 19B:
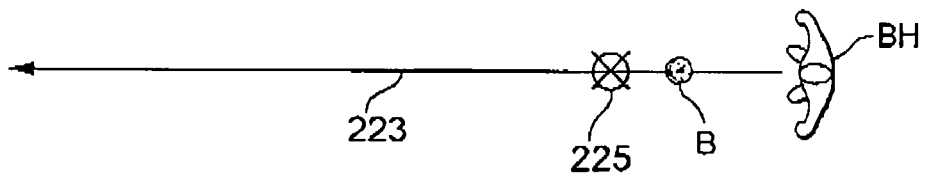
Figure 19C:
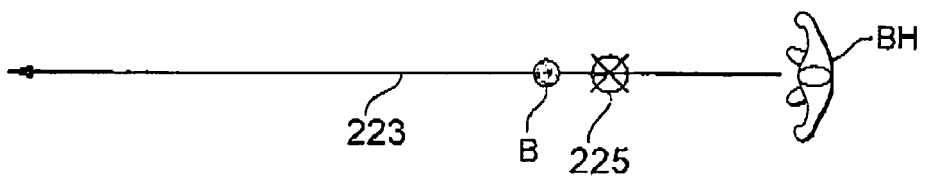

On the other hand, the target reference point may be fixed regardless of the speed (dribbling speed) of the ball holder. FIG. 19 is a diagram illustrating a relationship between speed (dribbling speed) of the ball holder of the ball holder and the target reference point. [Symbol] (a) indicates a case of slow speed dribbling, [symbol] (b) indicates a case of medium speed dribbling, and [symbol] (c) indicates a case of high speed dribbling. In these cases, the target reference point is fixed regardless of the speed (dribbling speed) of the ball holder.

Of course, as was described in detail in embodiment 1, the target reference point may be changed as appropriate based on a process of checking the state or the like of the athlete.

It should be noted that in the present embodiment description was given regarding a round run in a case where the self-character is caused to move to the delay defense area (target reference point), but this round run can also be applied for example in a case of movement in which the position of the ball itself is set as the target reference point.

I claim:

1. A game device comprising:
one or more processors; and
memory storing a program for execution by the one or more processors, the program being for executing a ball game that is executed by causing a first character and a second character to move in a virtual space and put a ball into a goal, and causing the one or more processors to execute a process of generating images of the virtual space as viewed from a virtual viewpoint and displaying the images on a screen, the program comprising:
a first process of determining whether or not the second character is in possession of the ball;
a second process of determining whether or not an operation signal has been received from operation means operated by a game player;
a third process of determining, when the operation signal has been received from the operation means, whether or not the first character is positioned within a region that is set corresponding to the second character away from a position where the second character is present;
a fourth process of causing the first character to move toward the region when the second character is in possession of the ball and when the first character is not positioned inside the region; and
a fifth process of keeping the first character inside the region is included when reception of the operation signal is continued during the third and fourth processes and is continued after the fourth process,
wherein a distance of the second character to the region is changed in response to a distance between the second character and the goal.

2. A game device comprising:
one or more processors; and
memory storing a program for execution by the one or more processors, the program being for executing a ball game that is executed by causing a first character and a second character to move in a virtual space and put a ball into a goal, and causing the one or more processors to execute a process of generating images of the virtual space as viewed from a virtual viewpoint and displaying the images on a screen, the program comprising:
a first process of determining whether or not the second character is in possession of the ball;
a second process of determining whether or not an operation signal has been received from operation means operated by a game player;
a third process of determining, when the operation signal has been received from the operation means, whether or not the first character is positioned within a region that is set corresponding to the second character away from a position where the second character is present;
a fourth process of causing the first character to move toward the region when the second character is in possession of the ball and when the first character is not positioned inside the region;
a fifth process of determining whether or not a movement operation signal causing the first character to move is received from the operation means when the first character is positioned inside the region; and
a sixth process of causing the first character to move only within the region in response to the movement operation signal,
wherein a distance of the second character to the region is changed in response to a distance between the second character and the goal.

3. A non-transitory computer readable medium on which a program is recorded, the program being for executing a ball game that is executed by causing a first character and a second character to move in a virtual space and put a ball into a goal, and causing a computer to execute a process of generating images of the virtual space as viewed from a virtual viewpoint and displaying the images on a screen, the program comprising:
a first process of determining whether or not the second character is in possession of the ball;
a second process of determining whether or not an operation signal has been received from operation means operated by a game player;
a third process of determining, when the operation signal has been received from the operation means, whether or not the first character is positioned within a region that is set corresponding to the second character away from a position where the second character is present;
a fourth process of causing the first character to move toward the region when the second character is in possession of the ball and when the first character is not positioned inside the region; and
a fifth process of keeping the first character inside the region is included when reception of the operation signal is continued during the third and fourth processes and is continued after the fourth process,
wherein a distance of the second character to the region is changed in response to a distance between the second character and the goal.

4. The game device according to claim 1 or 2, wherein a position of the region is changed to a position farther from the second character for distances between the second character and the goal that are farther.

5. The game device according to claim 1 or 2, wherein the size of the region is changed according to the state or characteristics of the second character.

* * * * *